United States Patent [19]

Makara et al.

[11] 3,761,605

[45] Sept. 25, 1973

[54] PHASE ERROR CORRECTION SYSTEM FOR A VIDEO TAPE RECORDER

[75] Inventors: Satoshi Makara; Toshiro Kitazaki; Masao Inaba, all of Tokyo, Japan

[73] Assignee: Nippon Electric Company, Limited, Tokyo, Japan

[22] Filed: Oct. 8, 1971

[21] Appl. No.: 187,644

[52] U.S. Cl. 178/5.4 CD, 178/6.6 TC, 179/100.2 K, 179/100.2 T

[51] Int. Cl. ....... G11b 5/44, H04n 5/78, H04n 9/02

[58] Field of Search .................. 178/5.4 CD, 6.6 A, 178/6.6 TC; 179/100.2 T, 100.2 K

[56] References Cited

UNITED STATES PATENTS

| | | | |
|---|---|---|---|
| 3,504,111 | 3/1970 | Sumida | 178/5.4 CD |
| 3,381,083 | 4/1968 | Jensen | 179/100.2 K |
| 3,614,305 | 10/1971 | Hidaka | 179/100.2 K |
| 3,580,991 | 5/1971 | Krause | 178/5.4 CD |

*Primary Examiner*—Howard W. Britton
*Attorney*—Sandoe, Hopgood and Calimafde

[57] ABSTRACT

A phase error correction system for a color video tape recorder having a plurality of recording/reproducing heads is disclosed in which the color video signal to be phase-corrected is phase-compared with a stable reference signal at the line intervals to produce coarse correction signals. Fine correction signals in the Nth through the last lines in each head channel are obtained by the coarse correction signals for one line and the imediately preceding line. Fine correction signals are obtained in the first (N-1) lines from the coarse correction signals in the Nth line before one revolution of the head drum. The coarse correction signals are added to the fine correction signals to produce a phase correction signal which is used to phase compensate the color video signal.

6 Claims, 17 Drawing Figures

PHASE ERROR CORRECTION SYSTEM FOR A VIDEO TAPE RECORDER

This invention relates generally to phase error correction system, and more particularly to a system for correcting, in the 4-head color video tape recorder (VTR), the phase error of the carrier chrominance signal of a NTSC color television signal.

In the prior art system, coarse correction and fine correction systems have been used for achieving phase error correction on the color television signal.

In the corase correction system the phases of the burst signal and the reference subcarrier signal are compared with each other at each horizontal blanking period to form an error signal, and the error signal is held for one horizontal scanning period (hereinafter referred to as a "line") whereby a coarse correction signal having a staircase waveform is obtained. In this system, the phase is corrected at the time point of the burst signal and the color phase difference within one line is therefore not corrected.

In contrast, in the fine correction system the phase difference between the mutually adjacent lines is detected to form a fine correction signal, in response to which the phase error is corrected. Thus, the color difference within the one line can be corrected. More specifically, the video signal to be phase-difference-corrected is delayed, for example, by one line, and the delayed signal is compared with the non-delayed signal, with the burst signal phase as a reference. A sawtooth wave having a slope proportional to the phase difference of the mutually adjacent burst signals is obtained as the fine correction signal. This system requires the use of a so-called "1 H delay line" which is very expensive, and moreover, its reliability is relatively low.

The fine correction signal can alternatively be obtained by comparing the coarse correction signal of mutually adjacent lines. In this method, the timing of the fine correction signal to be obtained lags that of the video signal to be error-corrected by one line. Therefore, the coarse correction signals are stored in sixty-six capacitors which cover one line period. After one revolution of the head drum, the stored coarse correction signals of the mutually adjacent lines are compared with each other to produce the fine correction signal. More specifically, the coarse correction signals of the N th and (N+1) th lines in a certain head channel stored in the respective capacitors are read out and compared with each other in the next head channel to obtain the fine correction signal for compensating the phase of the video signal of the N th line in the next head channel. In this method, more than 66 memory elements must be used for storing the coarse correction signals in one revolution of the head drum, because one revolution of the head drum includes about 66 lines.

By the use of these fine correction systems, it is possible to compensate the phase error very correctly. These systems are, however, very complicated in construction and very costly to manufacture.

It is therefore an object of this invention to provide an economical but accurate phase error correction system for color video tape recorders.

According to this invention, there is provided a phase error correction system in which the color video signal to be phase-error-corrected is phase-compared with a stable reference signal at the line intervals, to produce coarse correction signals. Fine correction signals in the Nth through the last lines in each head channel are obtained by the coarse correction signals for one line and for the previous line, and fine correction signals in the first (N−1) lines are obtained from the coarse correction signals in the Nth line before one revolution of the head drum.

The features and advantages of this invention will be understood from the following detailed description of a preferred embodiment of this invention taken in conjunction with the accompanying drawings, wherein.

Figure 1:
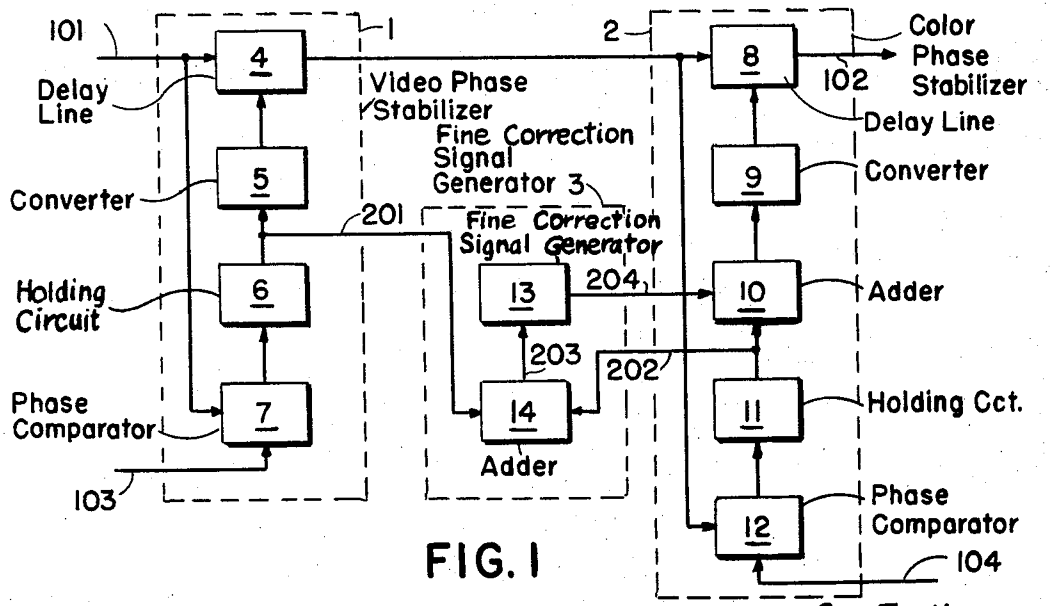
FIG. 1 is a schematic block diagram of a phase error correction system according to an embodiment of this invention.

Referring to FIG. 1, a video signal 101 reproduced by four magnetic heads in a 4-head video tape recorder (VTR) and having a time error is coarsely corrected in phase by a video phase stabilizer (VPS) 1. The output signal from the VPS 1 is precisely phase corrected by a color phase stabilizer (CPS) 2. Two coarse correction signals 201 and 202 developed in phase stabilizers 1 and 2 respectively are added to produce a coarse correction signal 203 from which a fine correction signal 204 is developed by a fine correction signal generator 3. The fine correction signal 204 is applied to the color phase stabilizer 2.

In the video phase stabilizer 1, the video signal 101 is applied to a phase comparator 7 where it is phase-compared with a stable reference signal 103 of 15.75 KHz. The detected phase error signal is temporarily held by a holding circuit 6 for one line period whereby the coarse correction signal 201 with respect to a horizontal synchronizing signal is obtained. The coarse correction signal 201 is also applied to a $\gamma$ converter 5 at which it is $\gamma$ -converted. The output signal from the coverter 5 is applied to a high speed voltage-controlled variable delay line 4 and is there controlled in delay time. Thus, the phase of the video signal 101 is coarsely compensated. The delay time of the delay line 4 is proportional to the $1/\gamma$ power of the control voltage. In the $\gamma$ converter 5, therefore, the phase error voltage 201 is raised to the $\gamma$th power (i.e., $\gamma$conversion), and thus the ouptut signal of the $\gamma$ converter 5 and the delay time of the relay line 4 are placed into a linearly proportional relationship.

The video signal coarsely compensated in phase by the video phase stabilizer 1 still has a residual phase error. That video signal is applied to a phase comparator 12 in color phase stabilizer 2 and is there phase-compared with reference subcarrier 104 of 3.58 MHz. The detected phase error signal is held by a holding circuit 11 for one line period, whereby the coarse correction signal 202 with respect to a subcarrier signal is obtained. The coarse correction signals 201 and 202 are added together by an adder 14 in fine correction signal generator 3 to produce the coarse correction signal 203. The correction signal 203 is applied to a fine correction signal generator 13 in which the fine correction signal 204 is generated. The fine correction signal 204 is added to the coarse correction signal 202 by an adder 10. The output signal of the adder 10 is $\gamma$ -converted by a $\gamma$ converter 9. The converted signal output of converter 9 is used to control the delay time of a high speed voltage-controlled variable delay line 8 whereby the phase error of the video signal is accurately corrected.

The time variation component produced in the 4-head VTR is composed mainly of a 240 Hz component synchronized with the rotation of the head drum having four magnetic heads. On the other hand, the nominal frequency of the horizontal signal is 15.75 KHz, and the sampling period at which the time error is detected is short in comparison with the period of variation in the reproduced signal phase. In addition, time errors produced between mutually adjacent horizintal video signals closely approximate each other. Hence, by deviating the compensation of the time error by one line period, it is possible to compensate the phase of the video signal with sufficient accuracy.

Figures 3A, 3B, 3C, 3D:
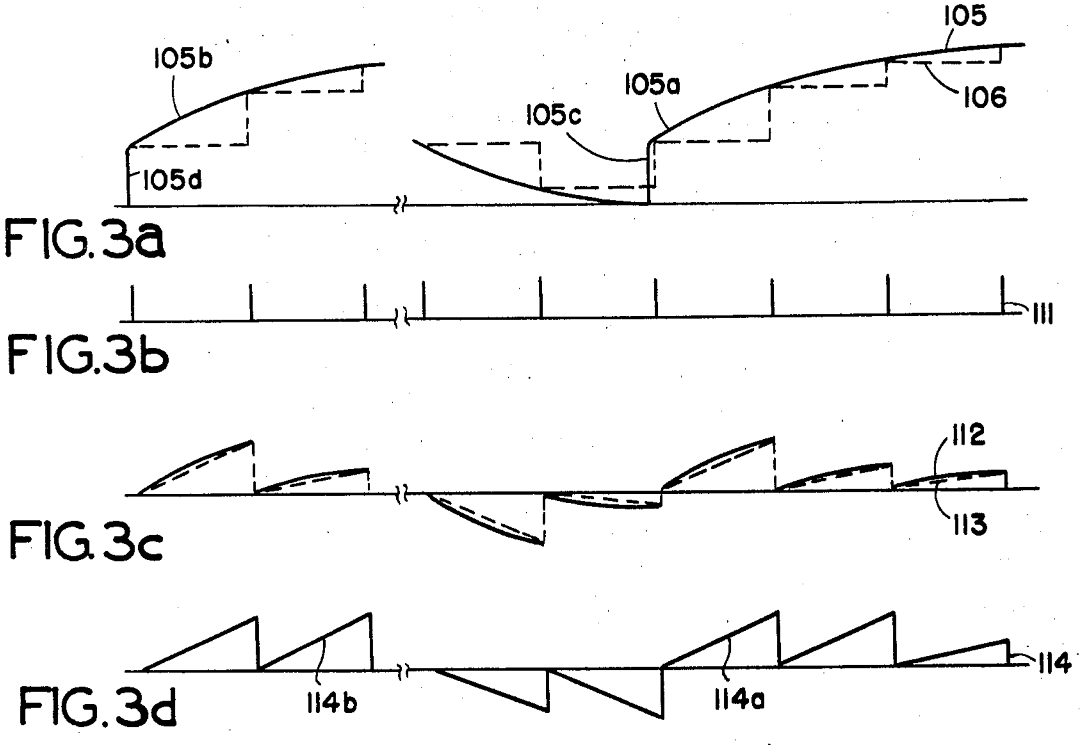
FIGS. 3*a* — 3*d* and FIGS. 4*a* – 4*k* are wave forms appearing at various parts of the embodiment of this invention.

Referring now to FIG. 3, there is illustrated the principle of the fine correction signal generating system. A phase error 112 (FIG. 3*c*) remains even after compensating the reproduced video signal phase variation 105 (FIG. 3*a*) to the reference signal by the coarse correction signal 106. (FIG. 3*a*). In order to compensate this residual error, the coarse correction signals 106 of the Nth and (N+1)th lines in a certain head channel are compared with each other. Then, the fine correction signal 114 (FIG. 3*d*) for the (N+1)th line has a slope proportional to the detected difference. The timing of the fine correction signal lags that of the signal to be compensated by one line. By adding the fine correction signal 114 to the coarse correction signal 106, the video signal is almost completely compensated in phase.

The foregoing compensating operation is effective only within a certain head channel. In a 4-head VTR, the time errors between adjacent head channels are not relevant to one another. The fine correction signal of the second line before one revolution of the head is used as the fine correction signal for the first line of each channel. The correction signal for the second line of a certain identical channel before one rotation of the head is stored in a capacitor for each channel. In FIG. 3*a*, the references 105*c* and 105*d* denote channel switching points, 105*a* is a phase displacement of a certain head channel, and 105*b* is a phase displacement of the same head channel before one rotation of the head. A correction signal 114*b* before one rotation is used for the correction signal 114*a* of the first line period (FIG. 3*d*).

Figure 2:
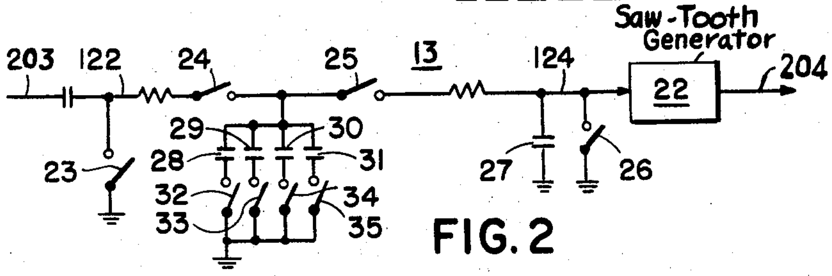
FIG. 2 is a circuit diagram of a fine correction signal generator employed in the embodiment of this inventon shown in FIG. 1.
Figures 4A, 4B, 4C, 4D, 4E, 4F, 4G, 4H, 4I, 4J, 4K:
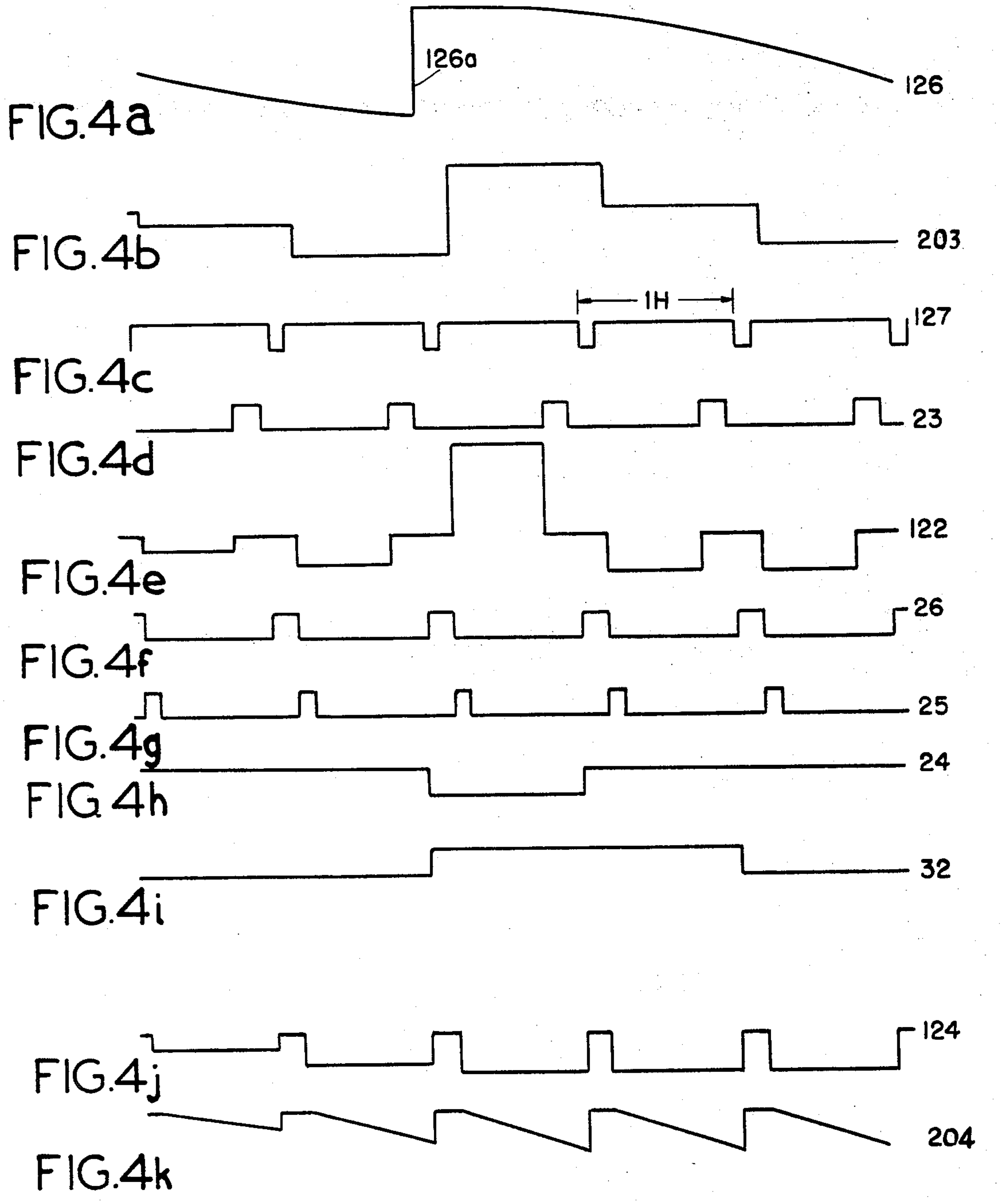

Referring to FIG. 2 showing the fine correction signal generator 13, the coarse correction signal 203 (FIG. 4*b*) is clamped in its trailing part, line by line, by means of a switch 23 in order to obtain the difference between adjacent two lines. The clamped signal is stored in a capacitor 27 for one line when both switches 24 and 25 are closed. The switch 25 is opened upon charging the capacitor 27 so as to prevent the capacitor from being discharged. A saw-tooth wave generator 22 is driven by the charge stored in the capacitor 27 whereby a saw-tooth wave corresponding to the stored charge is formed. This saw-tooth wave output 204 (FIG. 4*k*) is applied to the adder 10 (FIG. 1). The purpose of the switch 26 is to reset the previous hold signal at each line. The switch 24 is in the off stage only for the first line of each channel and is in the on state for the other periods. Switches 32, 33, 34 and 35 are in the on state only for the first and second lines of channels 1, 2, 3 and 4 and are in the off state for the other periods. In other words, the switch 24 is off and the switch 32 is on for the first line of the first channel. Under this condition, the charge stored in the capacitor 28 is used as the fine correction signal for the first line. During the second line period, the switches 24 and 32 are both on, and the clamped signal (FIG. 4 *e* ) is used as the correction signal and at the same time is charged in the capacitor 28. The signal charged in the capacitor 28 is used as the correction signal for the first line of the identical channel after one revolution of the head drum. Similarly, capacitor 29 and switch 33, capacitor 30 and switch 34, and capacitor 31 and swirch 35 are used in the second, third and fourth channels, respectively.

Signal 111 (FIG. 3*b*) represents a burst signal, and signal 113 (FIG. 3*c*) is a fine correction signal that is obtained by comparing the coarse correction signals of adjacent lines. Signals 126 and 126*a* (FIG. 4*c*) represent the phase deviations similar to signal 105 FIG. 3*a*, and signal 127 (FIG. 4*c*) represents the horizontal sync signal. signals 122 (FIG. 4*e*) and 124 (FIG. 4*j*) respectively represent the signals appearing at points 122 and 124 in FIG. 2. Pulses 23, 24, 25, 26, and 32 (FIGS. 4*d*, 4*b*, 4*g*, 4*f*, and 4*c*) respectively represent the signals for operating the correspondingly numbered switches in FIG. 2 to the on or closed position.

What is claimed is:

1. A phase error correction system for a video tape recorder for color television video signals or the like having a plurality of recording/reproducing heads, said system comprising:

means for producing coarse correction signals including means for phase-comparing the reproduced color video signal with a stable reference signal at the line intervals;

means for producing fine correction signals for the Nth through the last lines in each head channel by comparing said corase correction signals for one particular line and the immediately preceding line;

means for producing fine correction signals for the first through the (N−1)th lines in each head channel from said coarse correction signal for the Nth line in the corresponding head channel of the previous revolution of the head;

means for adding said coarse correction signals and said fine correction signals to produce a phase correction signal; and means for phase compensating said color video signal by said phase correction signal.

2. The system of claim 1, in which said coarse correction signals producing means further comprises means coupled to said phase-comparing means for temporarily holding the detected phase error signal output of said phase-comparing means for one line period for producing first coarse correction signals.

3. The system of claim 2, in which said coarse correction signals producing means further comprises second means for coarsely phase compensating the video siganl in accordance with said first coarse correction signal, second means for phase comparing the coarsely phase compensated video signal with a reference subcarrier to produce a second coarse correction signal, and means for adding said first and second coarse correction signals.

4. The system of claim 3, in which said first-mentioned adding means includes means for adding said second coarse correction signals and said fine correction signals.

5. The system of claim 3, further comprising second means coupled to said second phase-comparing means for temporarily holding the detected phase error signal output of said second phase-comparing means for one line period.

6. The system of claim 5, in which said second phase compensating means comprises a voltage-controlled delay means having a delay equal to $1/\gamma$ of the control voltage applied thereto, and means coupled to said first-mentioned holding means for converting said first coarse correction signals by raising said coarse correction signals to the $\gamma$th power.

* * * * *

UNITED STATES PATENT OFFICE

CERTIFICATE OF CORRECTION

Patent No. 3,761,605 Dated September 25, 1973

Inventor(s) Satoshi Makara, Toshiro Kitazaki, and Masao Inaba

It is certified that error appears in the above-identified patent and that said Letters Patent are hereby corrected as shown below:

IN THE CAPTION:

Foreign Priority should be indicated as follows:

--Japan Application No. 89838/1970, October 12, 1970.--

IN THE CLAIMS:

Column 4, Claim 1, line 37, "corase" should be --coarse--.

Signed and sealed this 11th day of June 1974.

(SEAL)
Attest:

EDWARD M.FLETCHER,JR.
Attesting Officer

C. MARSHALL DANN
Commissioner of Patents